United States Patent
Li et al.

(10) Patent No.: US 10,552,172 B2
(45) Date of Patent: Feb. 4, 2020

(54) VIRTUAL APPLIANCE SUPPORTING MULTIPLE INSTRUCTION SET ARCHITECTURES

(71) Applicant: VMware, Inc., Palo Alto, CA (US)

(72) Inventors: Ye Li, Newton Highlands, MA (US); Cyprien Laplace, Boston, MA (US); Andrei Warkentin, North Andover, MA (US); Alexander Fainkichen, Southborough, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 127 days.

(21) Appl. No.: 15/880,964

(22) Filed: Jan. 26, 2018

(65) Prior Publication Data
US 2019/0065213 A1    Feb. 28, 2019

Related U.S. Application Data

(60) Provisional application No. 62/549,690, filed on Aug. 24, 2017.

(51) Int. Cl.
*G06F 9/44* (2018.01)
*G06F 9/455* (2018.01)
*G06F 16/11* (2019.01)
*G06F 9/4401* (2018.01)
*G06F 9/445* (2018.01)

(52) U.S. Cl.
CPC ........ *G06F 9/4408* (2013.01); *G06F 9/44505* (2013.01); *G06F 9/45558* (2013.01); *G06F 16/119* (2019.01); *G06F 2009/45575* (2013.01)

(58) Field of Classification Search
CPC .............. G06F 9/4408; G06F 9/44505; G06F 9/44547; G06F 9/45558; G06F 16/119; G06F 9/44558
See application file for complete search history.

(56) References Cited

U.S. PATENT DOCUMENTS

| | | | |
|---|---|---|---|
| 7,260,702 B2 * | 8/2007 | Vega | G06F 12/10 711/203 |
| 9,710,291 B2 * | 7/2017 | Kruglick | G06F 9/44521 |
| 9,965,307 B2 * | 5/2018 | Petrov | G06F 9/45558 |

* cited by examiner

*Primary Examiner* — Stefan Stoynov
(74) *Attorney, Agent, or Firm* — Patterson + Sheridan, LLP

(57) ABSTRACT

An example method of provisioning a virtual appliance to a virtualized computing system, comprising: deploying the virtual appliance to the virtualized computing system, the virtual appliance including a system partition, one or more disk images, and configuration data, the configuration data defining a virtual machine executable on each of a plurality of processor architectures, the system partition configured to boot on any one of the plurality of processor architectures; and booting the virtual appliance from the system partition.

20 Claims, 5 Drawing Sheets

FatVM 110

System Partition 402 | Disk Image(s) 404 | Configuration Data 406

VIRTUAL APPLIANCE SUPPORTING MULTIPLE INSTRUCTION SET ARCHITECTURES

CROSS-REFERENCE TO RELATED APPLICATIONS

This application claims priority to U.S. Provisional Patent Application Ser. No. 62/549,690, filed Aug. 24, 2017, which is incorporated herein by reference in its entirety.

BACKGROUND

A computing system can include an operating system (OS) executing on a hardware platform, which includes processor(s), memory, storage, input/output (TO) devices, and the like. When the OS executes directly on the hardware platform, the OS is referred to herein as a "host OS." Computer virtualization is a technique that involves encapsulating the hardware platform of the computing system into virtual hardware platforms on which virtual machine(s) execute under control of virtualization software. A virtual machine (VM) provides virtual hardware abstractions for processor, memory, storage, and the like to a guest operating system (OS) and guest application(s) that run on the guest OS. The virtualization software provides virtual hardware platforms and virtual execution environments for the virtual machine(s).

In some virtualized environments, the hosts have different hardware architectures, such as central processing units (CPUs) having different instruction set architectures (ISAs). However, care must be taken to deploy virtual machine images to hardware with matching ISAs. For example, if a data center includes both x86-based and ARM-based services, the system administrator must build and maintain twice as many virtual machine images (e.g., a VM image for each ISA). Also, moving a VM image between platforms having different ISAs becomes impossible, as an x86-based VM image is not compatible with a hardware platform having an ARM ISA and vice versa.

SUMMARY

One or more embodiments relate to a method of provisioning a virtual appliance to a virtualized computing system, comprising: deploying the virtual appliance to the virtualized computing system, the virtual appliance including a system partition, one or more disk images, and configuration data, the configuration data defining a virtual machine executable on each of a plurality of processor architectures, the system partition configured to boot on any one of the plurality of processor architectures; and booting the virtual appliance from the system partition.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
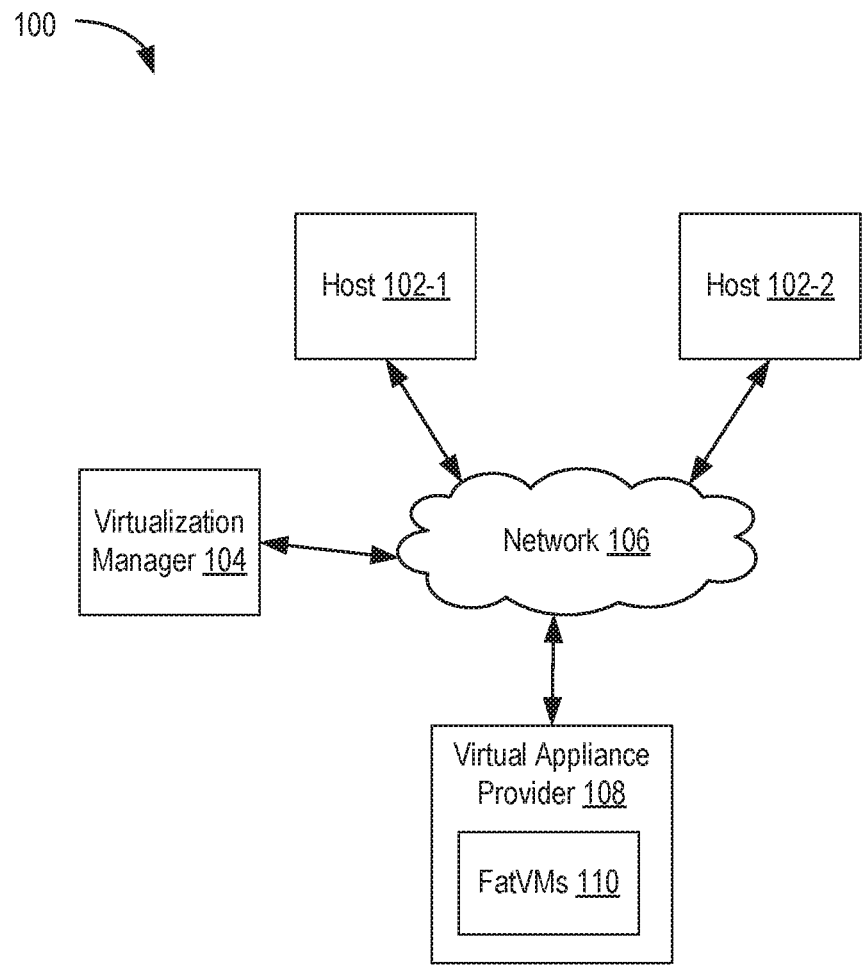
FIG. 1 is a block diagram of a networked computer system according to an embodiment.

FIG. 1 is a block diagram of a computer system 100 according to an embodiment. Computer system 100 includes a plurality of host computers ("hosts 102") (e.g., a host 102-1 and a host 102-2), a virtualization manager 104, a virtual appliance provider 108, and a network 106. Although only two hosts 102-1 and 102-2 are shown, computer system 100 can include more than two hosts. Each host 102 is virtualized, as described further below. In general, each host 102 includes a hypervisor executing on a hardware platform that supports execution of one or more virtual machines (VMs). Virtualization manager 104 is a computer or virtual machine that executes software for managing hosts 102 and software executed therein (e.g., the hypervisors and VMs). Virtual appliance provider 108 is a computer or virtual machine that stores and provides virtual appliances for execution on hosts 102. A virtual appliance is a software image that provides a pre-configured operating system (OS) environment and applications for execution as a virtual machine.

In an embodiment, hosts 102 have hardware platforms that include processors having different instruction set architectures (ISAs). For example, host 102-1 can include a hardware platform with an x86 processor and host 102-2 can include a hardware platform with an ARM-based processor. In general, the ISA of the processor in host 102-1 is different than the ISA of the processor in host 102-2. An application binary compiled for the ISA used by host 102-1 cannot execute on the host 102-2 and vice versa. Thus, a virtual appliance built specifically for the ISA used by host 102-1 cannot be provisioned to host 102-2 and vice-versa. Virtual appliance provider 108 provides FatVMs 110. A FatVM 110 is a virtual appliance that can be seamlessly provisioned for either host 102-1 or host 102-2 regardless of ISA. In general, a FatVM 110 includes a number of disk images and associated configuration and metadata distributed in a known format, such as the Open Virtualization Format (OVF). FatVMs 110 can be various virtual appliances, such as virus scanners, network services, virtualization management servers, and the like.

Figure 2:
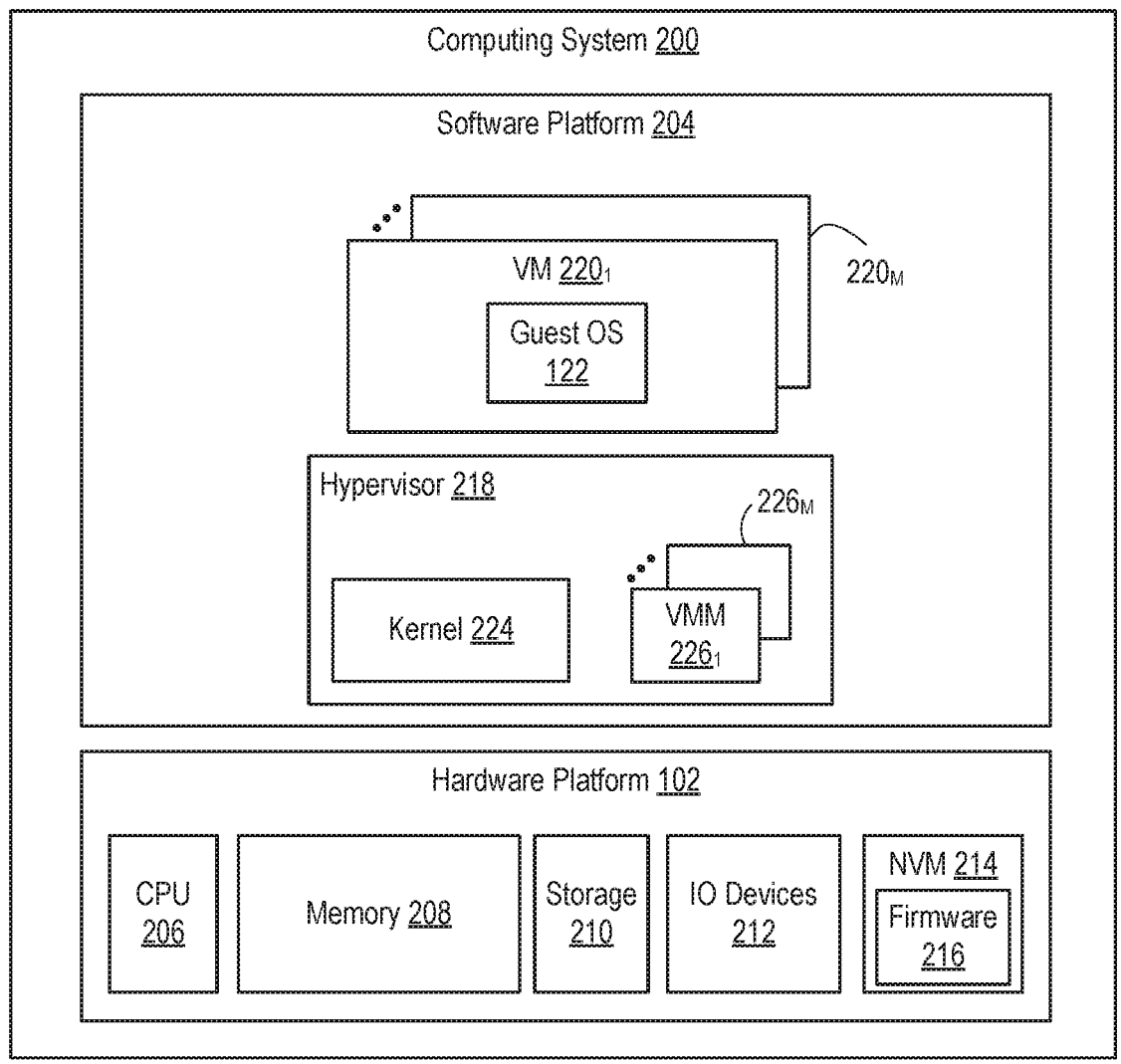
FIG. 2 is a block diagram depicting a computing system according to an embodiment.

FIG. 2 is a block diagram depicting a computing system 200 according to an embodiment. Computing system 200 can be used as any of hosts 102 shown in FIG. 1. Computing system 200 includes a software platform 204 executing on a hardware platform 202. Hardware platform 202 may include conventional components of a computing device, such as a central processing unit (CPU) 206, system memory ("memory" 208), storage 210, input/output (10) devices 212, a nonvolatile memory (NVM) 214. CPU 206 is configured to execute instructions, for example, executable instructions that perform one or more operations described herein and may be stored in memory 208 and storage 210. Memory 208 is a device allowing information, such as executable instructions, virtual disks, configurations, and other data, to be stored and retrieved. Memory 208 may include, for example, one or more random access memory (RAM) modules. Storage 210 includes local storage devices (e.g., one or more hard disks, flash memory modules, solid state disks, and optical disks) and/or a storage interface that enables computing system 200 to communicate with one or more network data storage systems. Examples of a storage interface are a host bus adapter (HBA) that couples computing system 200 to one or more storage arrays, such as a storage area network (SAN) or a network-attached storage (NAS), as well as other network data storage systems. IO devices 212 include conventional interfaces known in the art, such as one or more network interfaces, serial interfaces, universal serial bus (USB) interfaces, and the like. NVM 214 is a device allowing information to be stored persistently regardless of the state of power applied to computing system 200 (e.g., FLASH memory or the like). NVM 214 stores firmware 216 for computing system 200, such as a Basic Input/Output System (BIOS), Unified Extensible Firmware Interface (UEFI), or the like.

Figure 3:
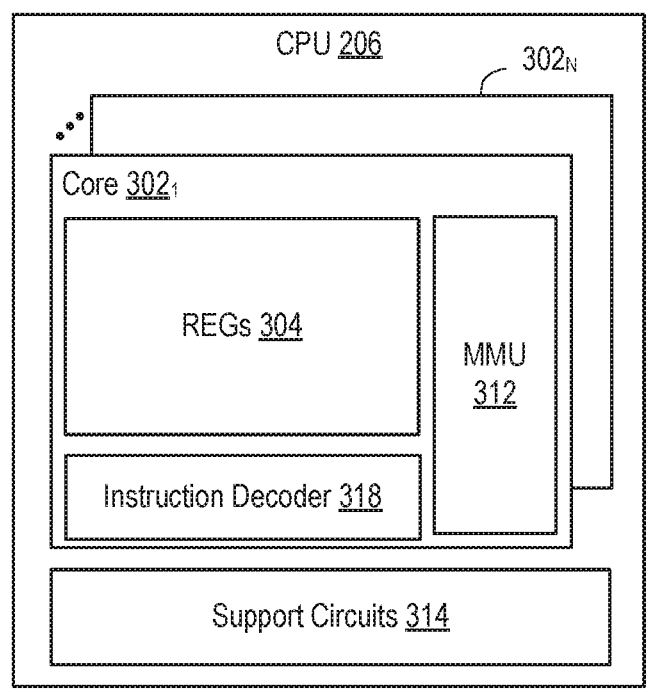
FIG. 3 is a block diagram depicting a central processing unit (CPU) according to an embodiment.

FIG. 3 is a block diagram depicting CPU 306 according to an embodiment. CPU 306 includes one or more cores 302 (e.g., cores $302_1 \ldots 302_N$, where N is an integer greater than zero) and support circuits 314. Each core 302 is a microprocessor or like type processor element. Each core 302 includes, among other components, registers 304, a memory management unit (MMU) 312, and an instruction decoder 318. Other components of core 302 (e.g., an arithmetic logic unit (ALU), floating point unit (FPU), program registers, cache memory, etc.) are omitted for clarity. Support circuits 314 include circuitry shared by cores $302_1 \ldots 302_N$, such as cache memory, direct memory access (DMA) circuits, interrupt controller circuits, an input/output MMU (IOMMU), and the like.

System registers 304 include registers for use by code to configure and control core 302. Instruction decoder 318 supports an instruction set of core 302. Instruction decoder 318 decodes input instructions and controls functional units of core 302 to perform the input instructions. The instruction set of core 302 can include branch instructions, exception generating instructions, system instructions, data processing instructions, load and store instructions, and the like. As noted above, the instruction set for one host can be different from the instruction set for another host in the same data center (e.g., a data center can include x86-based hosts and ARM-based hosts). MMU 312 implements memory management in the form of paging of memory 208. MMU 312 controls address translation and access permissions for memory accesses made by core 302.

Returning to FIG. 2, software platform 204 includes a virtualization layer that abstracts processor, memory, storage, and networking resources of hardware platform 202 into one or more virtual machines ("VMs") $220_1 \ldots 220_M$ (collectively VMs 220) that run concurrently on computing system 200. VMs 220 run on top of the virtualization layer, referred to herein as a hypervisor 218, which enables sharing of the hardware resources by VMs 220. One example of hypervisor 218 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 218 is known as a Type-1 or "bare-metal" virtualization software. In other embodiments, hypervisor 218 can be a Type-2 hypervisor that executes within an underlying OS.

Each VM 220 supported by hypervisor 218 includes guest software that runs on the virtualized resources supported by hardware platform 202. In the example shown, the guest software of each VM 220 includes a guest OS 222. Guest OS 222 can be any commodity operating system known in the art, such as such as Linux®, Microsoft Windows®, Mac OS®, or the like. VM 220 can also include various applications (not shown) that execute therein in with support of guest OS 222. As noted above, a VM 220 can be provisioned as a virtual appliance, such as a FatVM 110 described further herein.

Hypervisor 218 includes, among other components, a kernel 224 and virtual machine monitors (VMMs) $226_1 \ldots 226_M$ (collectively VMMs 226). Kernel 224 provides operating system functionality (e.g., process creation and control, file system, process threads, etc.), as well as CPU scheduling and memory scheduling. VMMs 226 are processes scheduled by kernel 224 to implement the virtual system support for VMs 220. Each VMM 226 manages a corresponding virtual hardware platform. The virtual hardware platform includes virtual CPUs (vCPUs), guest physical memory, virtual 10 devices, and the like. At power-on of computing system 200, firmware 216 performs initialization of hardware platform 202. Firmware 216 hands of execution to a bootloader of hypervisor 218. The bootloader performs various initialization tasks.

Figure 4:
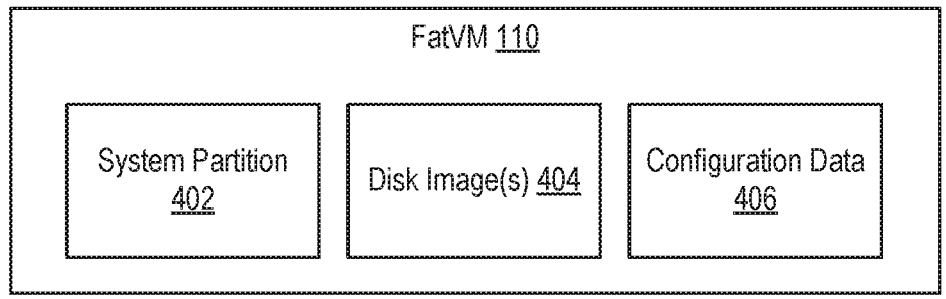
FIG. 4 is a block diagram depicting a virtual appliance according to an embodiment.

FIG. 4 is a block diagram depicting a FatVM 110 according to an embodiment. FatVM 110 includes a system partition 402, one or more disk images 404, and configuration data 406. Configuration data 406 can include a number of configuration files, such as a virtual machine configuration file including settings for the VM, an nvram file including firmware settings, and the like. Configuration data 406 includes a set of configuration files for each supported architecture (e.g., one set for x86 and another set for ARM). Configuration data 406 optionally includes a set of shared configuration files that are used regardless of architecture. Disk image(s) 404 include application binaries, libraries, kernel modules, and the like that provide the guest software of the VM. Various configurations of disk image(s) 404 are discussed below that support multiple architectures. System partition 402 includes files necessary for booting the VM. An example of system partition 402 is described below with respect to FIG. 5.

Figure 5:
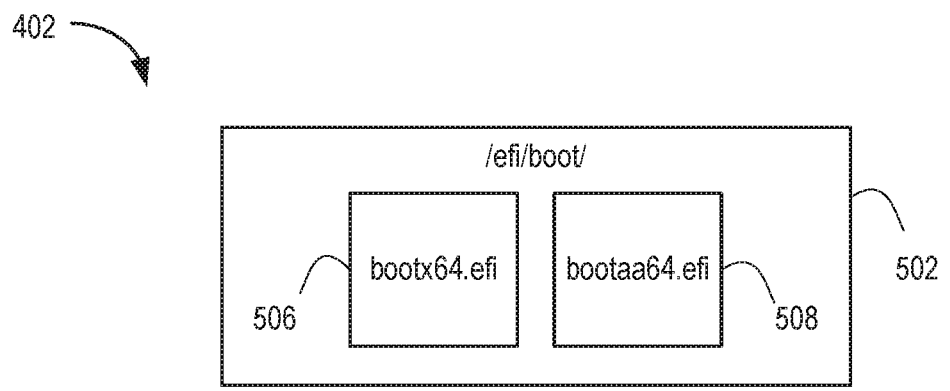
FIG. 5 is a block diagram depicting a system partition in a virtual appliance according to an embodiment.
Figure 5:
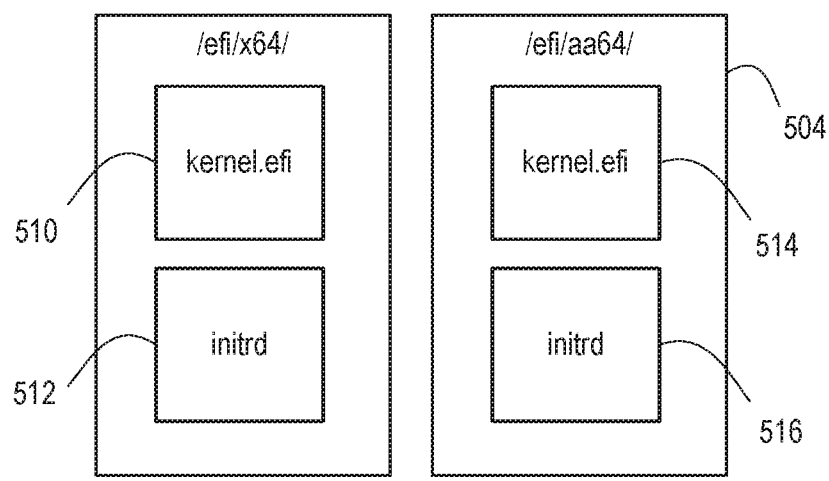

FIG. 5 is a block diagram depicting a system partition 402 in a FatVM 110 according to an embodiment. System partition 402 includes a bootx64.efi file 506 and a bootaa64.efi file 508 in an /efi/boot/ 502 directory. The Unified Extensible Firmware Interface (UEFI) standard specifies naming conventions for boot loaders (e.g., bootx64.efi for x86 and bootaa64.efi for ARM64). An OS installation can boot on multiple architectures by providing a separate boot loader for each one. FatVM 110 includes files 506 and 508 for supporting two architectures (e.g., x86 and ARM in the example). System partition 402 also includes a kernel.efi file 510 and an initrd file 512 in a directory /efi/x64, and a kernel.efi file 514 and an initrd file 516 in a directory /efi/aa64/ directory 504. Separate kernel and initrd images are provided for each architecture so that the boot loader can choose the correct kernel and initial RAM disk depending on the configuration. In the example, FatVM 110 includes kernel and initial RAM disk files for x86 and ARM architectures.

After the correct kernel is booted with its initrd image and before pivoting to the real root filesystem and executing the init process to setup the user environment, the appropriate filesystem with the correct binaries must be used depending on the architecture. There are various embodiments discussed below for providing multiple architecture support in FatVM 110.

Figure 6:
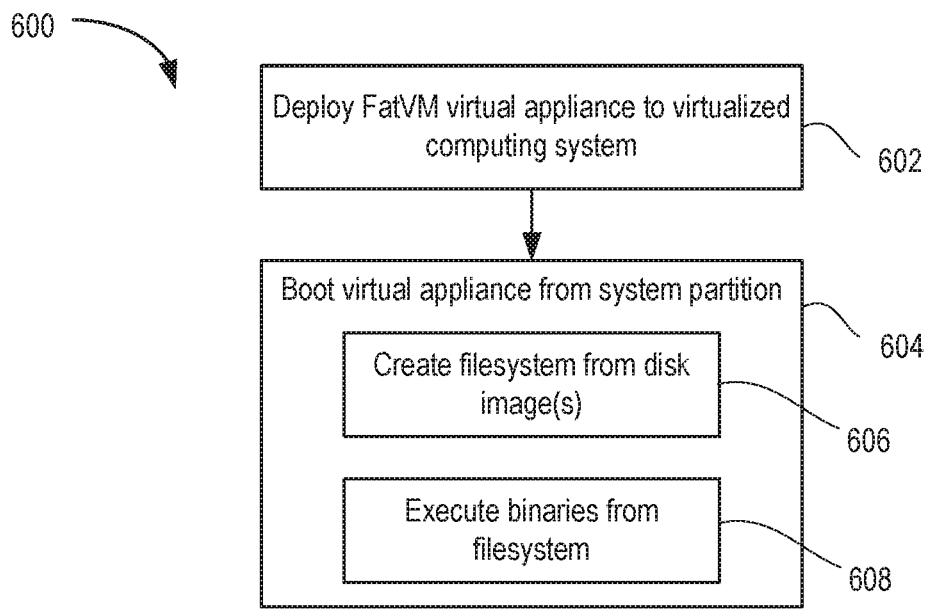
FIG. 6 is a flow diagram depicting a method of provisioning a virtual appliance to a virtualized computing system according to an embodiment.

FIG. 6 is a flow diagram depicting a method 600 of provisioning a FatVM 110 to a virtualized computing system according to an embodiment. Method 600 begins at step 602, where an administrator deploys a FatVM 110 to the virtualized computing system. At step 602, hypervisor 218 boots FatVM 110 from system partition 402. In an embodiment, the virtual appliance creates a filesystem from disk image(s) 404 at step 606. At step 608, the virtual appliance executes binaries from the filesystem.

In one embodiment, binaries, libraries, kernel modules, and the like are compiled into a universal binary format, such as FatELF. FatELF is a file format that embeds multiple ELF binaries for different architectures into one file. FatELF is actually a container format that adds some accounting information at the start of the file and then appends all the ELF binaries afterwards. FatELF can be used for both executable files and shared libraries. In an embodiment, FatVM 110 has a single disk image 404 that includes binaries, libraries, kernel modules, and the like in a universal binary format, such as FatELF or the like. The advantages of this embodiment is that only a single disk image 404 is needed to serve as the root filesystem that can be booted on multiple architectures. The universal binary format eliminates the need for scripts and special configurations for picking the correct binaries to load when booting on different architectures. Non-binary files, such as configuration files, images, video files, etc. can be shared and managed transparently on different architectures. There is no need for replication and conversion. However, the support for universal binary format requires that the OS support the executables. Thus, at step 606, the virtual appliance can create a filesystem from a single disk image and at step 608 the virtual appliance can execute binaries having a universal binary format.

In another embodiment, FatVM 110 includes multiple disk images 404. For example, FatVM 110 can include a disk image 404 for each supported architecture. All binaries used by FatVM 110 are packaged inside architecture-specific disk images and replicated across platforms.

In another embodiment, FatVM 110 merges the support for different architectures in the same filesystem, avoiding the duplication of the common files or the manipulation of several file systems. At step 606, all binaries and libraries are moved to different directories, which have the corresponding architecture name appended (e.g., /bin_$(arch), /lib_$(arch)). During the boot process, a script running from initrd creates the required symlinks to present the correct binaries and libraries to the system. Shared configuration, content, and state do not need additional treatment. However, similar to a multiple disk image approach, this technique adds complexity when upgrading or installing new software. The package manager needs to install architecture specific files in their corresponding directories.

In another embodiment, FatVM 110 includes a kernel image that includes a FatVM filesystem filter. At step 606, the directory names for binaries and libraries are re-mapped on-the-fly by the kernel into architecture-specific directories. Directories for the other architectures not being used are hidden. This technique avoids boot-time symlinking and makes the filesystem appear as standard as possible. However, the package manager needs the capability to see architecture specific directories during software installation and upgrade.

Figure 7:
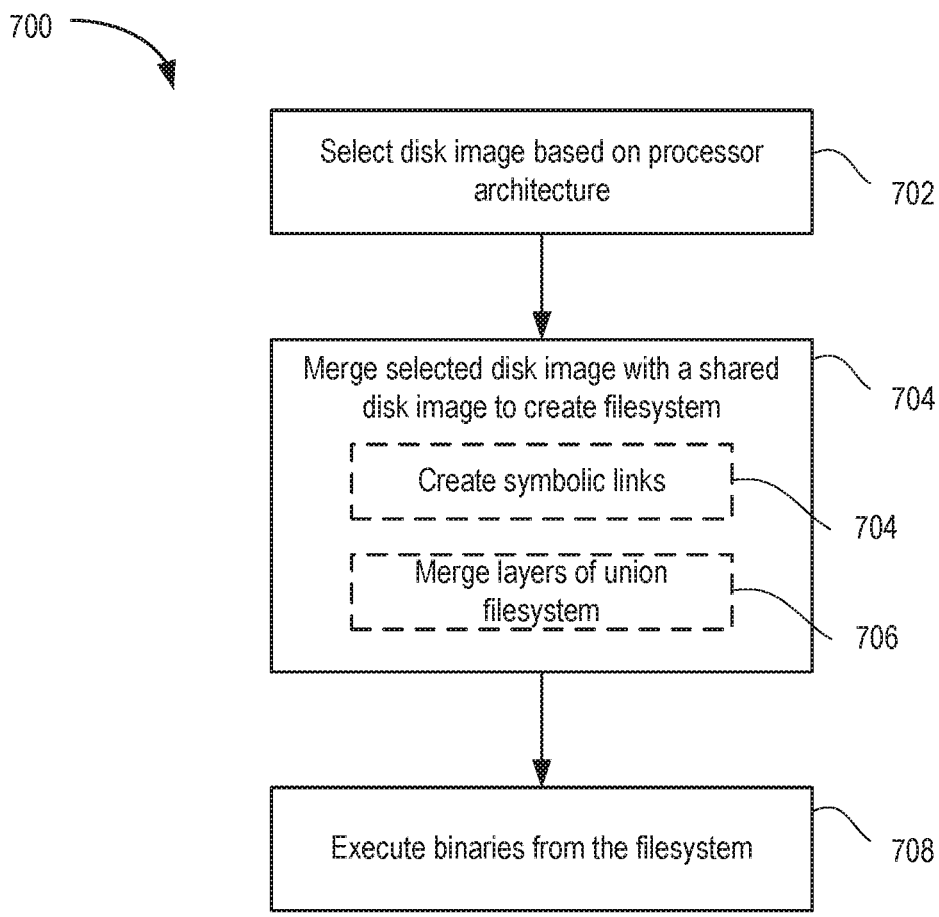
FIG. 7 is a flow diagram depicting a method of provisioning a virtual appliance having multiple disk images for different instruction set architectures according to an embodiment.

FIG. 7 is a flow diagram depicting a method 700 of provisioning a FatVM having multiple disk images for different ISAs according to an embodiment. At step 702, hypervisor 218 selects a disk image based on processor architecture. In an embodiment, a portion of the filesystem is shared across the supported architectures (e.g., non-binaries, such as configuration files, images, video files, etc.). Scripts in initrd are configured select the correct disk image 404 for the architecture and to merge the correct disk image with any shared disk(s) to construct the complete filesystem. At step 704, the virtual appliance merges the selected disk image with the shared disk image(s) to create a filesystem. At step 706, the virtual appliance executes binaries from the filesystem.

In an embodiment, at step 704, the virtual appliance creates symbolic links to merge the disk images. In another embodiment, at step 706, the virtual appliance merges layers of a union-based filesystem, such as OverlayFS and AUFS. For example, with OverlayFS, the architecture-specific disk image containing the binaries can serve as the bottom layer and the shared disk image with common files can serve as the top layer. The layers are merged to form a unified view of the filesystem. The advantage of using architecture-specific disk images is that no modification of the kernel and toolchain are necessary. However, this simplicity results in some added complexity for handing disk updates and maintaining multiple disk images.

In another embodiment, a synthetic block device can be used to achieve similar results as using multiple disk images. Hypervisor 218 can be configured for synthetic block device support, which allows for media (e.g., hard disk, CD/DVD, USB, floppy, etc.) to be efficiently mastered on the fly with contents as described by a recipe. Using a different recipe per architecture, a FatVM 110 can support multiple architectures for hypervisors that support such a synthetic block device.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments.

By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of provisioning a virtual appliance to a virtualized computing system, comprising:
    deploying the virtual appliance to the virtualized computing system, the virtual appliance including a system partition, one or more disk images, and configuration data, the configuration data defining a virtual machine executable on each of a plurality of processor architectures, the system partition configured to boot on any one of the plurality of processor architectures; and
    booting the virtual appliance from the system partition.

2. The method of claim 1, wherein the virtual appliance includes a single disk image, and wherein the step of booting comprises executing one or more binary files each having a universal binary format.

3. The method of claim 1, wherein the virtual appliance includes a plurality of disk images, and wherein the step of booting comprises:
    selecting a disk image from the plurality of disk images based on a processor architecture of the virtualized computing system; and
    executing one or more binary files from the disk image each having a format compliant with the processor architecture of the virtualized computing system.

4. The method of claim 3, wherein the plurality of disk images includes a shared disk image having files agnostic to the processor architecture of the virtualized computing system, and wherein the step of booting comprises:
    merging the disk image and the shared disk image to create a filesystem.

5. The method of claim 4, wherein the step of merging comprises creating symbolic links.

6. The method of claim 4, wherein the step of merging comprises using a union filesystem where the disk image is a bottom layer and the shared disk image is an upper layer of the union filesystem.

7. The method of claim 1, wherein the virtual appliance includes a first disk image having first binary files compliant with a first processor architecture and second binary files compliant with a second processor architecture, and wherein the step of booting comprises:
creating a filesystem using symbolic links to either the first or the second binary files depending on whether the processor architecture is the first processor architecture or the second processor architecture.

8. A non-transitory computer readable medium having instructions stored thereon that when executed by a processor cause the processor to perform a method of provisioning a virtual appliance to a virtualized computing system, comprising:
deploying the virtual appliance to the virtualized computing system, the virtual appliance including a system partition, one or more disk images, and configuration data, the configuration data defining a virtual machine executable on each of a plurality of processor architectures, the system partition configured to boot on any one of the plurality of processor architectures; and
booting the virtual appliance from the system partition.

9. The non-transitory computer readable medium of claim 8, wherein the virtual appliance includes a single disk image, and wherein the step of booting comprises executing one or more binary files each having a universal binary format.

10. The non-transitory computer readable medium of claim 8, wherein the virtual appliance includes a plurality of disk images, and wherein the step of booting comprises:
selecting a disk image from the plurality of disk images based on a processor architecture of the virtualized computing system; and
executing one or more binary files from the disk image each having a format compliant with the processor architecture of the virtualized computing system.

11. The non-transitory computer readable medium of claim 10, wherein the plurality of disk images includes a shared disk image having files agnostic to the processor architecture of the virtualized computing system, and wherein the step of booting comprises:
merging the disk image and the shared disk image to create a filesystem.

12. The non-transitory computer readable medium of claim 11, wherein the step of merging comprises creating symbolic links.

13. The non-transitory computer readable medium of claim 11, wherein the step of merging comprises using a union filesystem where the disk image is a bottom layer and the shared disk image is an upper layer of the union filesystem.

14. The non-transitory computer readable medium of claim 8, wherein the virtual appliance includes a first disk image having first binary files compliant with a first processor architecture and second binary files compliant with a second processor architecture, and wherein the step of booting comprises:
creating a filesystem using symbolic links to either the first or the second binary files depending on whether the processor architecture is the first processor architecture or the second processor architecture.

15. A computing system, comprising:
a hardware platform including a processor and a memory; and
a software platform executing on the hardware platform, the software platform including a hypervisor and a virtual appliance, the virtual appliance including a system partition, one or more disk images, and configuration data, the configuration data defining a virtual machine executable on each of a plurality of processor architectures, the system partition configured to boot on any one of the plurality of processor architectures, the hypervisor configured to boot the virtual appliance from the system partition.

16. The computing system of claim 15, wherein the virtual appliance includes a single disk image, and wherein the step of booting comprises executing one or more binary files each having a universal binary format.

17. The computing system of claim 15, wherein the virtual appliance includes a plurality of disk images, and wherein the hypervisor is configured to boot the virtual appliance by:
selecting a disk image from the plurality of disk images based on a processor architecture of the virtualized computing system; and
executing one or more binary files from the disk image each having a format compliant with the processor architecture of the virtualized computing system.

18. The computing system of claim 17, wherein the plurality of disk images includes a shared disk image having files agnostic to the processor architecture of the virtualized computing system, and wherein the hypervisor is configured to boot the virtual appliance by:
merging the disk image and the shared disk image to create a filesystem.

19. The computing system of claim 18, wherein the hypervisor is configured to boot the virtual appliance by using a union filesystem where the disk image is a bottom layer and the shared disk image is an upper layer of the union filesystem.

20. The computing system of claim 15, wherein the virtual appliance includes a first disk image having first binary files compliant with a first processor architecture and second binary files compliant with a second processor architecture, and wherein the hypervisor is configured to boot the virtual appliance by:
creating a filesystem using symbolic links to either the first or the second binary files depending on whether the processor architecture is the first processor architecture or the second processor architecture.

* * * * *